United States Patent [19]

Kirner

[11] 4,138,678
[45] Feb. 6, 1979

[54] INTEGRITY MONITORING SYSTEM FOR AN AIRCRAFT NAVIGATION SYSTEM

[75] Inventor: Ernest O. Kirner, Coral Springs, Fla.

[73] Assignee: The Bendix Corporation, Southfield, Mich.

[21] Appl. No.: 829,412

[22] Filed: Aug. 31, 1977

[51] Int. Cl.² ............................................. G01S 7/40
[52] U.S. Cl. .................................. 343/17.7; 343/5 LS
[58] Field of Search ............................. 343/5 LS, 17.7

[56] References Cited

U.S. PATENT DOCUMENTS

| | | | |
|---|---|---|---|
| 3,195,132 | 7/1965 | Battle et al. | 343/17.7 X |
| 3,248,729 | 4/1966 | Howard et al. | 343/17.7 X |
| 3,312,972 | 4/1967 | Alitz | 343/17.7 X |
| 3,924,341 | 12/1975 | Edelsohn | 343/17.7 X |

Primary Examiner—T.H. Tubbesing
Attorney, Agent, or Firm—W. G. Christoforo; B. L. Lamb

[57] ABSTRACT

An integrity monitor includes means at the ground station for periodically transmitting an integrity test signal comprising a coded first portion which identifies the signal and a coded second portion which is equivalent to a predetermined quantity. The airborne station includes a decoder which determines the type of test signal received and decodes the second portion to obtain a number which, if the system is operating properly, will compare favorably with a fixed reference. If the comparison is unfavorable, an alarm is sounded.

9 Claims, 8 Drawing Figures

INTEGRITY MONITORING SYSTEM FOR AN AIRCRAFT NAVIGATION SYSTEM

BACKGROUND OF THE INVENTION

This invention relates to an electronic all weather landing or navigation system, such as a microwave landing system (MLS), for aircraft and more particularly to means for providing a highly reliable and fail-safe integrity monitoring system which can immediately detect the presence of erroneous guidance data generated by a ground MLS station or processed by an airborne MLS unit.

There is a need for an electronic all weather landing system for aircraft, such as an MLS system, to alleviate the crowded conditions at various airports. One such MLS system which has recently been developed comprises ground based antennas which sweep horizontal and vertical fan shaped beams through the field of interest, nominally the airport approach space, at a known rate through known bounds. Thus, an aircraft in the field of interest will be periodically illuminated by the beams. By means of known techniques and equipment, the illuminated aircraft can determine from the characteristics of the illumination two coordinates of its position in space with respect to the radiating antennas to a very close tolerance. Accurate distance measuring equipment at the ground station and in the aircraft provides the aircraft with the final coordinate so that it can accurately determine its position in space as it approaches the airport and thus can make an expeditious and safe landing even under adverse weather conditions.

Since the landing of an aircraft is generally considered its most vulnerable maneuver, the importance of the aircraft having accurate information as to its position with respect to the airport is readily seen; and it can be understood that erroneous MLS signals during this phase of operation of the aircraft can be extremely dangerous. It is thus quite important that any erroneous guidance data be immediately recognized as such so that corrective action can be taken. The erroneous data can arise by either malfunctioning of the ground station equipment whereby erroneous data is transmitted into the field of interest or by malfunctioning of the airborne equipment whereby the processing of the received data produces erroneous utilization data. Erroneous guidance data can also occur as a result of data propagation phenomena such as multipath or by other electrical interference in the field of interest either intentional such as electronic countermeasures (ECM) or unintentional such as radio frequency interference (RFI). This electrical interference can come from sources within the aircraft such as by malfunctioning of other equipment or improper use of electronic devices by passengers or it can originate from other aircraft or from the ground.

SUMMARY OF THE INVENTION

The present invention in its simplest form comprises an integrity monitoring system utilizing predetermined test signals transmitted periodically from an MLS ground station. The airborne guidance equipment receives and processes the test signals. If the processed output does not agree with an expected result, erroneous data is indicated and an alarm is generated to alert the aircraft crew or for other appropriate action. This type of integrity monitoring is particularly attractive for checking time multiplexed systems such as the MLS wherein a common processor is time shared to perform several guidance functions and can thus be time shared to process the received integrity signals. As will be shown below, the invention can be used to ensure the integrity of both the angle guidance systems and the distance measuring equipment.

As previously mentioned, a basic MLS is comprised of ground angle guidance transmitter means which include horizontal and vertical antennas which, respectively, sweep a fan shaped radar beam through a predetermined angle at a predetermined rate either horizontally or vertically, as the case may be to provide azimuth and elevation data to a thereby illuminated aircraft. In addition, a DME transponder provides slant range to a predetermined point thus providing all the data necessary for the aircraft to accurately determine its position in the field of interest. To implement the integrity monitoring system of the invention requires the addition of test signal generators to the ground angle guidance equipment and to the ground DME transponder. As will be explained, the test signal generators periodically generate test signals having distinctive coding which identifies them as test signals. Decoding equipment on the aircraft decode the test signals and the normal MLS airborne processors then process the signals. Comparison equipment determines whether the processed test signals fall within predetermined bounds.

DESCRIPTION OF THE PREFERRED EMBODIMENT

Figure 1:
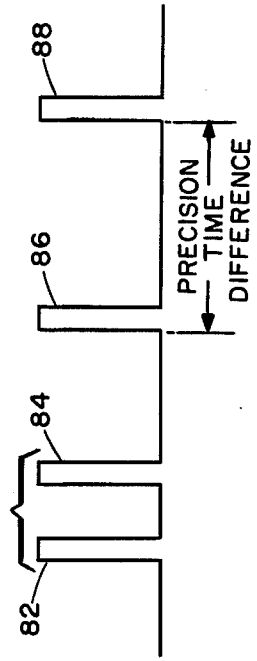
FIG. 1 shows the format of an appropriate DME integrity test signal for use in the invention.

To provide integrity checking for the MLS-DME a test generator is provided with the ground based DME transponder and which periodically generates a test signal having a format such as that shown in FIG. 1, reference to which should now be made. The test signal preferably includes a test code comprised of two precisely time-spaced pulses 10 and 12 which, as will be seen, are decoded by the airborne DME integrity monitoring equipment to identify the signal in this particular example as the DME test signal and further to reset an airborne range clock to some predetermined state. In the present embodiment the range clock described here and the other clocks to be described comprise a source of clock pulses and a counter for accumulating the clock pulses. In this case, the preferred aforementioned predetermined state is a zero count. Of course, in other embodiments, other types of clocks such as analog types can be used. A third precisely time-spaced pulse 14 is decoded by the airborne integrity equipment to restart the range clock and a simulated reply comprised of pulses 16 and 18, also transmitted by the ground based test generator, is decoded by the airborne integrity equipment to stop the range clock and to compare the resultant number therein with a predetermined reference number. It should be obvious that the delay between pulse 14 and pulse 18 corresponds to a predetermined test distance, which is suitably about one mile, one mile being the beginning of the critical portion of the aircraft landing approach.

Figure 2:
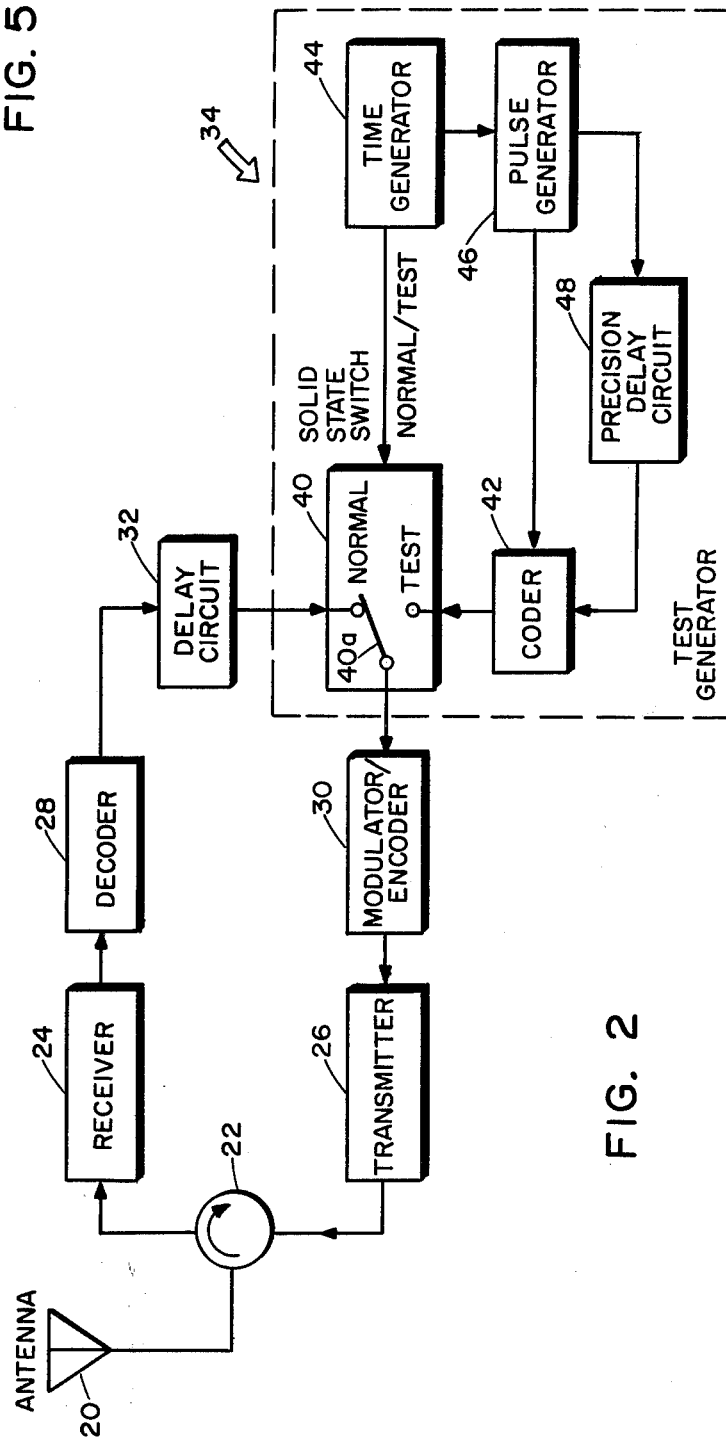
FIG. 2 is a block diagram of an embodiment of an MLS-DME ground transponder having an integrity monitor test generator.

Refer now to FIG. 2 which shows a block diagram of the MLS-DME ground transponder including a test generator 34. The transponder equipment includes standard elements including antenna 20 which is connected through circulator 22 serially to receiver 24, decoder 28 and delay circuit 32 and to transmitter 26 and modulator/encoder 30. As known to those skilled in the art, the transponder normally receives an interrogation signal from an aircraft in the field of interest which is requesting slant range information. The interrogation signal is decoded in decoder 28 and upon being delayed by delay circuit 32, is transmitted from modulator/encoder 30 by transmitter 26 via circulator 22 and antenna 20. Normally, that is when the test signal is absent, the solid state switch 40 of test generator 34 is in position "normal" so that delay circuit 32 is connected directly to modulator/encoder 30. According to the invention a time generator 44 periodically switches link 40a of switch 40 to connect coder 42 to modulator/encoder 30. Simultaneously, time generator 44 excites pulse generator 46 to cause coder 42 and precision delay circuit 48 to generate the pulse train of FIG. 1, the precision delay between pulses 14 and 18 of that Figure being induced by delay circuit 48. The test pulse train is then transmitted in the conventional manner previously described.

Figure 3:
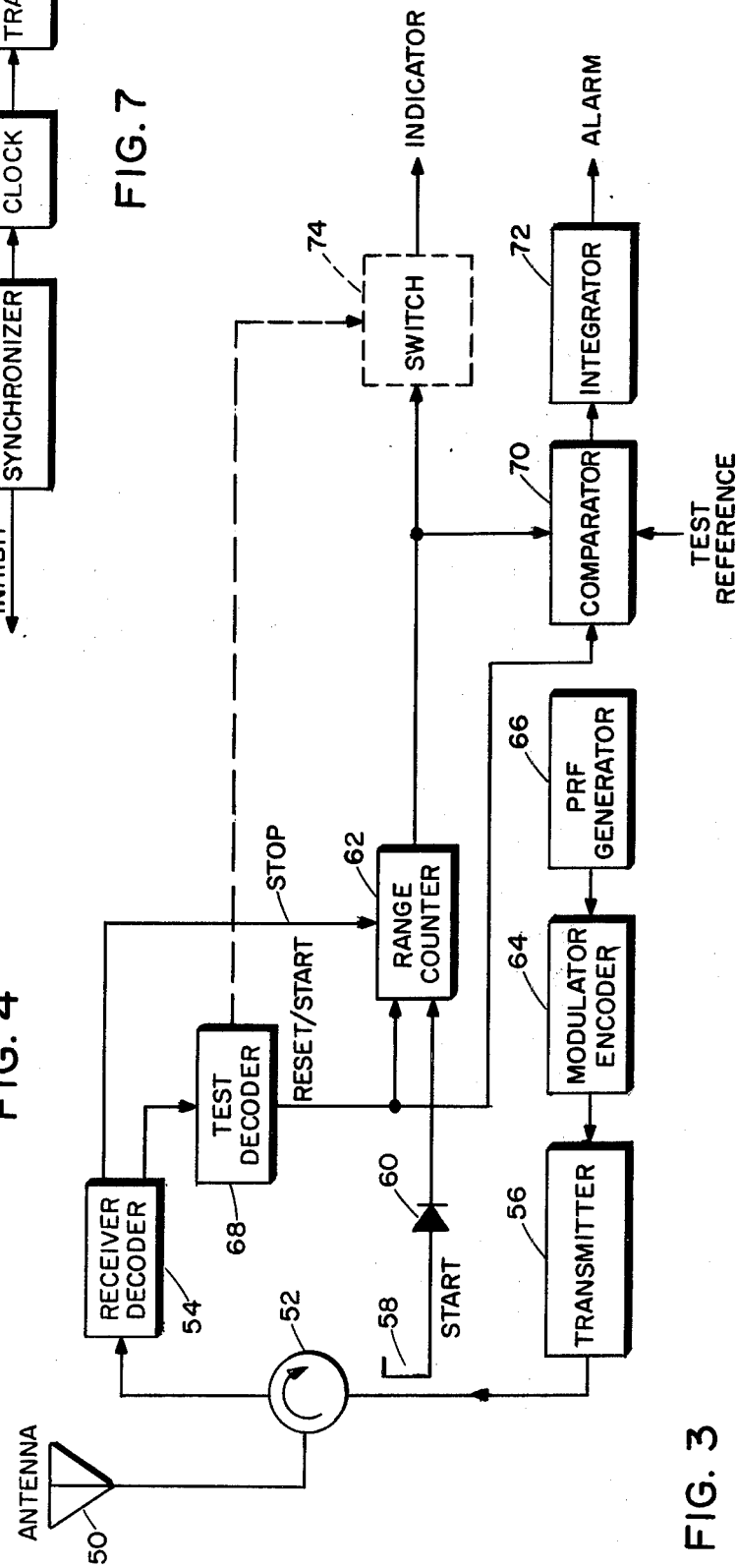
FIG. 3 is a block diagram of an embodiment of an airborne MLS-DME interrogator with integrity monitoring circuits.

Refer now to FIG. 3 which shows the airborne portion of the DME integrity monitoring circuits together with elements of the standard DME equipment. The standard DME interrogator elements include antenna 50 connected through circulator 52 to receiver/decoder 54 which in turn is connected to range counter 62. In addition, a PRF generator 66 is connected through modulator/encoder 64 and transmitter 56 and circulator 52 to antenna 50. In normal practice, that is when the aircraft is requesting slant range information from the ground DME transponder, a coded message is transmitted via the last mentioned elements, with the coded message being sampled by probe 58 and applied through diode 60 to reset and start a range clock such as range counter 62. As previously mentioned, the ground transponder replies with a message which is intercepted by antenna 50 and proceeds through circulator 52 to receiver/decoder 54 which generates a signal applied to range counter 62 to stop the operation thereof. Since the ground transponder turn around time is predetermined, the number now contained in range counter 62 corresponds to the slant range between the aircraft and the ground DME transponder. According to the present invention, the message of FIG. 1 transmitted by the ground transponder is received by antenna 50 and proceeds through circulator 52 to receiver/decoder 54 wherein the message is processed. A test decoder 68 recognizes reset pulses 10 and 12 of the message of FIG. 1 and generates a signal to reset range counter 62. Subsequently the restart pulse 14 of FIG. 1 is received and recognized by test decoder 68 to start range counter 62.

The simulated reply comprised of pulses 16 and 18 of FIG. 1 subsequently received are applied directly from receiver 54 to stop range counter 62. The reset and start signals from test decoder 68 have qualified a comparator 70 to now compare the contents of range counter 62 with a test reference number from a source not shown. If a comparison is favorable, that is, if the number in range counter 62 lies within acceptable limits about the test reference number, comparator 70 generates no output. If, however, the comparison is unfavorable, that is the number in range counter 62 is outside the acceptable limits, comparator 70 generates a signal which is applied to an integrator 72. The purpose of integrator 72 is to prevent an alarm from being sounded if only a small predetermined number of consecutive integrity signals show that there is some fault in the system so as to eliminate false alarms in the manner known to those skilled in the art. Optionally range counter 62 can be connected directly to an indicator (not shown), in which case not only will the actual slant range be shown thereon but also at periodic intervals the precision test range will be shown. This scheme has the advantage of testing the actual DME display. However, switch 74 controlled by test decoder 68 can be interposed between range counter 62 and the indicator whereby the receipt of the integrity test signal causes switch 74 to open so that the predetermined test range is not displayed. This latter scheme can be employed if the periodic display of the test range proves to be disconcerting to the aircraft operator. In this regard, the integrator 72 suitably has a time constant which corresponds to the repetition rate of the test signal transmission, thus preventing the generation of alarm signals during normal operation.

It should be noted that the integrity monitoring systems explained so far checks all circuits that can introduce range errors. For example, failures in the transmitter chain are detected by the normal search/track monitor since replies are received only after the ground transponder has received an interrogation. Of course, time delays in the transmitter chain will have no effect on the range accuracy since the range counter is started only from an output sample of the transmitter under normal operation.

The angle guidance integrity circuits consist of a ground transmitter test generator and an airborne monitor circuit. As previously mentioned, the angle guidance system of the MLS is normally comprised of an azimuth antenna which sweeps a vertically oriented fan shaped beam to and fro across the field of interest through a predetermined angle. The time between successive illuminations at an aircraft is thus a measure of the azimuth of aircraft with respect to the ground station. The elevation system operates in a similar manner, with an antenna sweeping a horizontally oriented fan shaped beam up and down through a predetermined angle. Again, the time between successive illuminations of the aircraft determines the elevation angle of the aircraft from the ground station.

Figure 5:
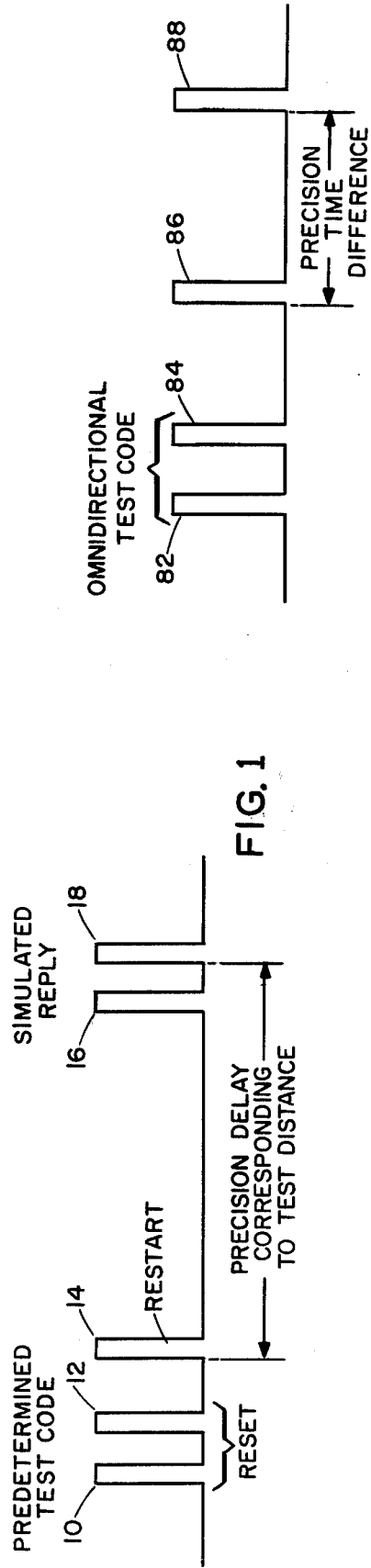
FIG. 5 is a typical angle guidance integrity test signal format.
Figure 4:
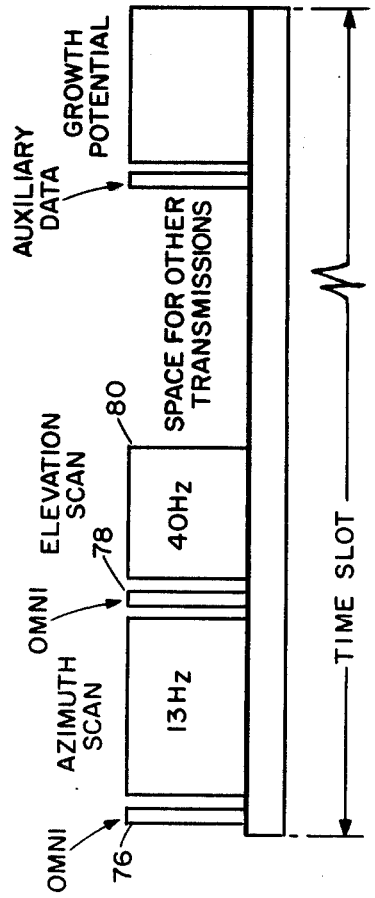
FIG. 4 is a typical MLS scan format.

Refer now to FIG. 4 which shows the normal angle guidance scan format for the ground station of the MLS. The signal format is within a time slot of a predetermined time duration. An omnidirectional antenna first produces a coded signal at the beginning of the time slot indicated by pulse 76 and which identifies the next signal as an azimuth scan. During the azimuth scan period, the azimuth antenna sweeps its beam through the aforementioned predetermined azimuth angle. A predetermined time later the omnidirectional antenna generates another omnidirectional coded signal, indicated as 78, which identifies the next signal as being elevation scan signal 80. During the elevation scan period, the elevation antenna sweeps its beam through the aforementioned elevation angle. The remainder of the time slot is reserved for other functions which are of no concern at the present time and for simplicity will not be described. Integrity test signals for either the azimuth scan or the elevation scan are similar to one another and a representative integrity test signal is shown at FIG. 5, reference to which Figure should now be made. Assuming first that the signal of FIG. 5 is an azimuth integrity test signal, during a particular time slot the omnidirectional signal 76 of FIG. 4 will be comprised of two time spaced pulses 82 and 84, the time between the pulses being an indication that the signal to follow will be an azimuth integrity test signal. Subsequently, the azimuth antenna will generate two sweeps of its beam in the same direction, for example either to-to or fro-fro. For an azimuth integrity signal these two sweeps will occur within the "azimuth scan" time block of FIG. 4. For an elevation integrity signal the two sweeps will occur within the "elevation scan" time block of FIG. 4. The time between successive sweeps will be accurately predetermined so that any aircraft within the field of interest will receive the two sweeps as two pulses represented by pulse 86 and 88 separated by a precise time difference. This predetermined precise time difference will be equivalent to a predetermined azimuth angle. The same procedure will be followed for the elevation integrity test signal, except that the omnidirectional test code will be transmitted by the ground station omnidirectional antenna during the period of pulse 78 of FIG. 4 and during the period represented at 80 of FIG. 4 the double elevation scan will be transmitted so that an illuminated aircraft will receive two pulses such as pulses 86 and 88 separated by a precise and predetermined time which will be a measure of a predetermined elevation angle. Of course, in this case the time between the pulses represented at 82 and 84 will be different for the azimuth integrity signal and the elevation integrity signal so as to identify the proper integrity signal to be subsequently transmitted. It should also be obvious that the pulses represented by 86 and 88 can also be generated during the azimuth scan period or elevation scan period, as appropriate, by the omnidirectional antenna, in which case all aircraft within the field of interest will receive the integrity test signals almost simultaneously, the time differing only by their range from the ground station antenna.

Figure 6:
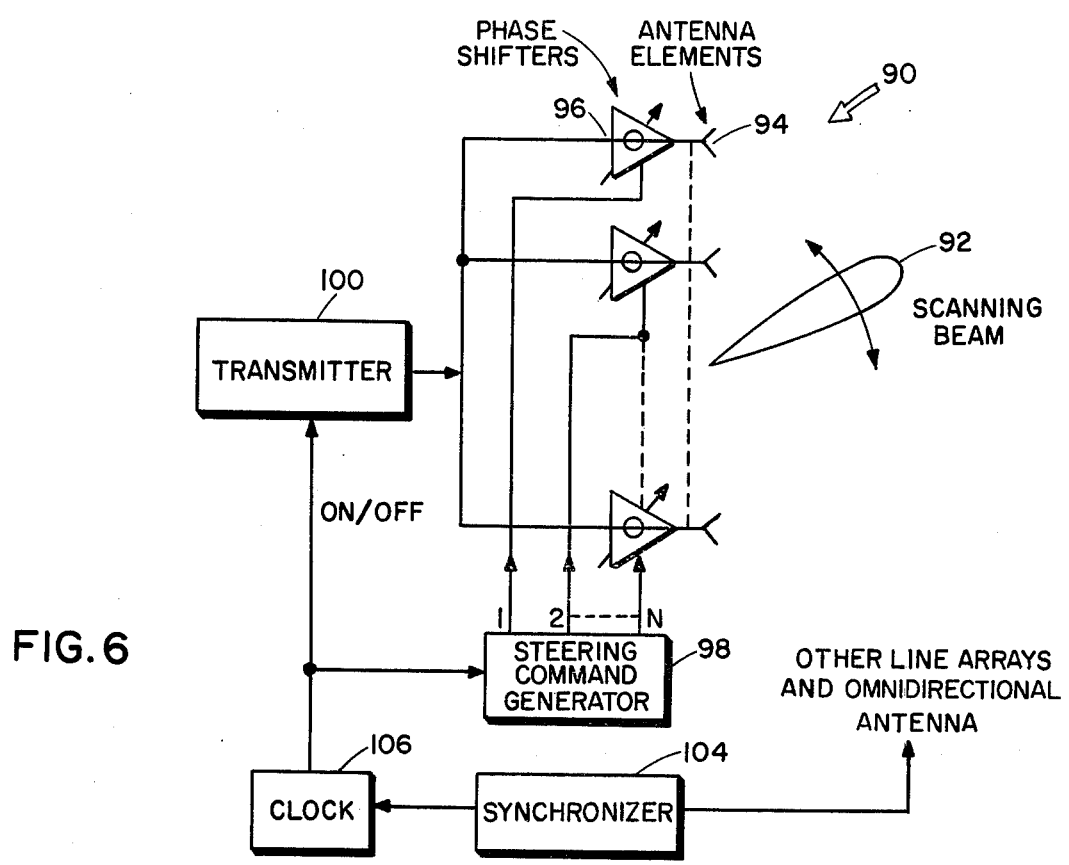
FIG. 6 is a typical block diagram of an MLS angle transmitter with an integrity test signal generator.

Refer now to FIG. 6 which shows in block diagram form a typical angle guidance ground station antenna 90 and associated elements together with the test generator of this invention. It is known to those skilled in the art that the standard MLS ground station antenna 90 is comprised of a line array of antenna elements 94 and associated phase shifters 96 operating under the command of a steering command generator 98 which causes a beam represented at 92 to scan through a predetermined angle at a predetermined rate. Radio frequency input for the antenna is received from transmitter 100. A synchronizer 104 periodically directs the omnidirectional antenna to transmit the aforementioned omnidirectional test code illustrated at FIG. 5. Simultaneously it instructs a clock 106 to cause steering command generator 98 to make the aforementioned two sweeps of beam 92 at predetermined and precise time intervals.

Figure 7:
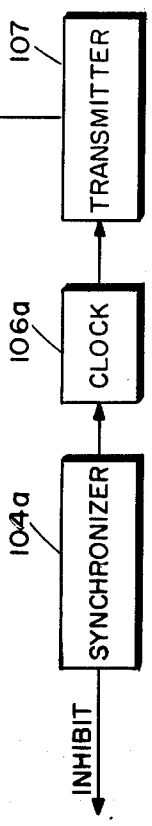
FIG. 7 shows a modification of the embodiment of FIG. 6.

Clock 106 also instructs transmitter 100 to energize the antenna elements during these two sweeps. In the alternate embodiment of the invention wherein the omnidirectional antenna generates and transmits not only the omnidirectional test code but also the pulses 86 and 88 of FIG. 5 the system of FIG. 7 is suitably employed. Refer to that figure where synchronizer 104a will periodically inhibit the scanning antenna such as antenna 90 of FIG. 6 and instruct clock 106a to command transmitter 107 and omnidirectional antenna 109 to produce the integrity test signal of FIG. 5.

Figure 8:
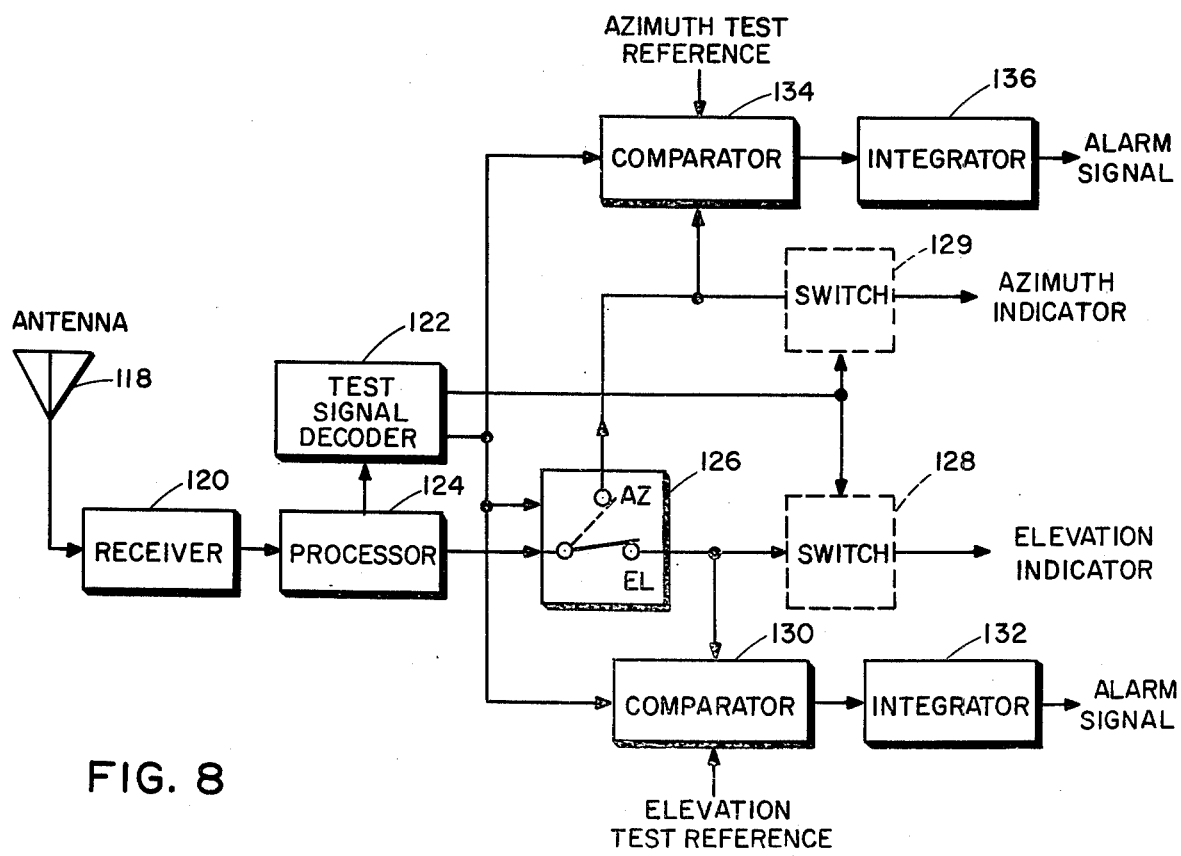
FIG. 8 is a block diagram of an MLS airborne angle receiver with integrity monitor circuits.

Refer now to FIG. 8 which shows a typical MLS airborne angle receiver with an integrity monitor of the present invention. FIG. 8 shows a receiving antenna 118 connected to receiver 120 which supplies received signals to a processor 124. As known to those skilled in the art, processor 124 includes a counter which determines the time period between two successive passes of a received signal, either the azimuth scanning beam or the elevation scanning beam depending on the channel employed, in order to determine the azimuth or elevation position of the aircraft respectively. An electronic switch 126 which operates in response to the omnidirectional signal received supplies the azimuth count or the elevation count as appropriate either through normally closed electronic switch 129 or normally closed electronic switch 128 to the azimuth indicator or elevation indicator respectively. In the integrity test mode the integrity test signals omnidirectional test code represented by pulses 82 and 84 of FIG. 5 are applied by the processor 124 to the test signal decoder 122. In this case the test signal decoder 122 causes electronic switch 126 to operate either to connect the processor to the elevation channel or to the azimuth channel as appropriate. In addition, test signal decoder 122 applies a qualifying signal to comparator 130 or 134 as appropriate. Processor 124 determines the angle equivalent to the time separation between the pulses 86 and 88 of the signal of FIG. 5 and applies this signal via switch 126 to the appropriate comparator 130 or 134. The signal is there compared against a predetermined test reference to determine whether the test signal is within the prescribed limits. As before, if the test signal is without the test limits the comparator generates an output which is applied through integrator 132 or 136 as appropriate to energize an alarm signal. As was the case with the DME integrity monitor, integrators 132 and 136 are provided having time constants which correspond to the repetition rate of the appropriate test signal transmission thereby preventing the generation of alarm signals during normal operation. Also as in the DME integrity monitor, optional switches 128 and 129 are provided to prevent a test indication from being displayed on the elevation or azimuth indicator if so desired.

Having described these embodiments of my invention, various modifications and alterations thereof will now be obvious to one skilled in the art. Accordingly, I claim as my property all the subject matter covered by the true spirit and scope of the appended claims.

The invention claimed is:

1. An integrity monitor for use in a navigation system having a ground station and airborne receiver means comprising at said ground station means for transmitting an integrity test signal into the field of interest of said ground station, said integrity test signal comprising a first coded portion identifying the type of test signal transmitted and a second coded portion equivalent to a predetermined quantity and comprising at said airborne receiver means for receiving and decoding said integrity test signal first and second portions and for comparing the decoded second portion against a predetermined reference signal to determine whether the predetermined quantity represented by said decoded second portion is within or without acceptable limits.

2. The integrity monitor of claim 1 wherein said means for transmitting comprises a transmitter which transmits said integrity test signal comprising a first coded portion identifying the type of test signal transmitted and a second portion equivalent to a predetermined range.

3. The integrity monitor of claim 2 wherein said airborne receiver means includes a clock which is reset in response to the decoding of the first portion of said test signal and wherein said second portion includes at least first and last pulses, said clock being started by decoding of said first pulse and stopped by decoding of said last pulse.

4. The integrity monitor of claim 3 wherein said clock comprises a counter which accumulates a number in response to the decoding of said first and last pulses and wherein said means for comparing comprises a comparator which compares said number against said predetermined reference signal.

5. The integrity monitor of claim 4 wherein said comparator generates an output when the decoded second portion is without acceptable limits, and including integrating means having a time constant which corresponds to the repetition frequency of the test signal transmissions from said ground station.

6. The integrity monitor of claim 1 wherein said means for transmitting comprises a transmitter which transmits said integrity test signal comprising a first coded portion identifying the type of test signal transmitted and a second portion equivalent to a predetermined angle.

7. The integrity monitor of claim 6 wherein said airborne receiver means includes processing means responsive to said second portion to attain a state equivalent to a predetermined angle when said microwave landing system is operating properly at least with respect to an angle transmission signal.

8. The integrity monitor of claim 7 wherein said processing means comprises means responsive to said second portion for accumulating a number, said number being representative of said state equivalent to a predetermined angle and wherein said number accumulated by said processing means is compared against said predetermined reference in said means for comparing, which latter means generates an output signal when said number is without said bounds.

9. The integrity monitor of claim 8 including an integrator responsive to the output signal from angle comparator and having a time constant which corresponds to the repetition frequency of the test signal transmissions from said ground station.

* * * * *